United States Patent [19]

Johnson et al.

[11] 4,022,660

[45] May 10, 1977

[54] COATED PARTICLES

[75] Inventors: James R. Johnson, White Bear Lake; Harold G. Sowman, Maplewood, both of Minn.

[73] Assignee: General Atomic Company, San Diego, Calif.

[22] Filed: Mar. 14, 1974

[21] Appl. No.: 451,309

Related U.S. Application Data

[63] Continuation of Ser. No. 379,401, June 30, 1964, abandoned, which is a continuation-in-part of Ser. No. 90,656, Feb. 21, 1961, Pat. No. 3,151,037.

[52] U.S. Cl. .............................. 176/67; 176/91 SP
[51] Int. Cl.² .......................................... G21C 3/06
[58] Field of Search .............. 176/67, 68, 69, 91 R, 176/91 SP

[56] References Cited

UNITED STATES PATENTS

| | | | |
|---|---|---|---|
| 3,121,047 | 2/1964 | Stoughton et al. | 176/91 SP |
| 3,166,614 | 1/1965 | Taylor | 176/91 SP |
| 3,228,848 | 1/1966 | Fellows | 176/91 SP X |
| 3,231,408 | 1/1966 | Huddle et al. | 176/91 SP |
| 3,291,696 | 12/1966 | Sugimoto et al. | 176/91 SP |
| 3,335,063 | 8/1967 | Goeddel et al. | 176/91 SP |
| 3,488,409 | 1/1970 | Beutler et al. | 176/67 X |
| 3,799,790 | 3/1974 | Schulz et al. | 176/69 X |

FOREIGN PATENTS OR APPLICATIONS

| | | | |
|---|---|---|---|
| 1,252,507 | 12/1960 | France | 176/91 |

OTHER PUBLICATIONS

*Reactor Core Materials*, vol. 4, No. 2, May 1961, p. 59.
AEC Document BMI-1468, 9/16/60, pp. 8–13.

*Primary Examiner*—Verlin R. Pendegrass
*Assistant Examiner*—Peter A. Nelson
*Attorney, Agent, or Firm*—Fitch, Even, Tabin & Luedeka

[57] ABSTRACT

A nuclear fuel particle wherein a core, up to about 250 microns in diameter, of a normally solid fissionable material is completely encased in a shell having at least two concentric layers. A yielding of carbonaceous material about 5 to about 50 microns thick is disposed inward of a layer of substantially impermeable refractory material, e.g., pyrocarbon, up to about 100 microns thick. Examples of the yielding layer include carbonized synthetic polymer resins and sooty pyrocarbon.

8 Claims, No Drawings

COATED PARTICLES

This application is a continuation of our copending application Ser. No. 379,401, filed June 30, 1964, now abandoned, which is a continuation-in-part of our earlier application Ser. No. 90,656, filed Feb. 21, 1961, now U.S. Pat. No. 3,151,037.

This invention relates to fuels for nuclear reactors and more particularly to particles of fissionable material encased in ceramic materials.

It is known that the design of nuclear reactors for use at high temperatures, where they will be most efficient, requires encasing the fissionable fuel materials to avoid corrosion and minimize the escape of fission products. While encasement or cladding of fuel elements in metal has been used for operation at low temperatures in connection with fuel elements of relatively large size, such expedients are not practical for use at temperatures of the order of 2000° C. or higher. Under these conditions, the use of refractory substances for encasement appears to be imperative. However, when ceramic materials are used as containers for relatively large-sized fuel elements, many problems arise with respect to the fragility of such containers, handling in the reactor, etc.

It has been proposed that fissionable materials be coated with refractory substances, for example, alumina, pyrolytic carbon and the like. Fissile fuels of ordinary size coated with or encased in refractory materials can withstand high temperatures and may be very resistant to corrosion. However, it is very difficult to provide coatings of this type on small particles which do not crack when exposed to radiation or heated to high temperatures, thus permitting the escape of fission products.

It is an object of this invention to provide a nuclear fuel particle having a refractory shell or coating which prevents the escape of fission products, which inhibits the diffusion of the fissionable material and which is useful at high temperatures up to the point at which the coating fails.

It is another object of this invention to provide nuclear fuel particles containing fissionable material, which are especially useful for incorporation into large fuel elements.

Still another object of the invention is to provide fuel elements useful in reactors at very high temperatures.

Other objects of the invention will be apparent from the disclosure hereinafter made.

In accordance with the above and other objects of the invention, it has now been found that nuclear fuel particles can be made in which the solid fissionable material has a shell comprising a first coating consisting of an expendable fission-product absorbing pyrocarbon layer over the entire outer surface of the particle, overlaid by at least one adherent, continuous outer coating or layer of hard, dense impervious pyrocarbon.

By the term "particles" as used herein it is intended to refer to fissionable materials having dimensions of 10 microns to about 200 mils in diameter, and preferably to particles consisting of spherules of fissionable materials.

"Spherules" means substantially spherical structures having a diameter in the range of about 10 microns up to about 125 mils, and which have a generally smooth surface overall. Such spherules are generally formed from the molten state by the operation of surface tension, and the interior has a crystalline structure characteristic of the particular material which is used. The spherules when viewed under high magnification appear to have a surface consisting of minute facets which, however, when taken overall effectively produce spherical surfaces. The presence of such minute facets is not material.

It is desirable that the particles used in the invention do not have extremely sharp points, although irregular particles with points, rough areas or oblate or ovate shape, or the like, are not objectionable for the purposes of the invention, because they are cushioned and rounded in the ultimate coated particle.

The novel coated nuclear fuel particles of the invention are produced by one of several means.

In one method for the preparation of the nuclear fuel particles of the invention, a spherule which is substantially free from voids is first coated with a uniform, continuous layer of a resin (synthetic polymer). Such initial coatings become carbonized upon heating, either before application of the outer shell, or during its formation. The coating which is thus produced is a yielding coating, i.e., when pressure is applied to the coating it can be compressed to a smaller thickness. It is porous or contains voids, as shown by its density which is a fraction of the theoretical density. Following completion of the initial coating, the spherule is coated with the selected refractory material to form the impermeable outer shell. The fuel particle is then ready for use.

In another method, the particles of fissionable material are coated with pyrocarbon to form both layers of the shell. The inner layer can in this case be a sooty coating, or pyrocarbon applied under conditions which produce a pyrocarbon coating having density of about 1.4 to 1.8. Pyrocarbon of this density offers an expendable coating which can be penetrated by diffusion or migration. Sooty coatings are yielding and relatively soft and porous. The outer layer of pyrocarbon is applied under conditions which produce density greater than 2.0; such coatings are gas-impermeable and relatively impermeable to diffusion of nuclear fuel materials.

In use, it is found that the inner coating accomodates to the expansion of the fissionable material owing to heating, as well as providing space for gaseous fission products, diffusion or migration of the fissionable material or swelling of the central fuel particle from the effects of radiation. Fission products are absorbed up to the capacity of the inner coating before pressure is exerted on the impermeable outer coating. As a result, the particles can withstand long periods of exposure to high temperatures in the reactor before the beginning of escape of fission products which forces shut down and replacement of the fuel elements.

The fissionable and fertile materials which are employed in the fuel particles of the invention include such actinide materials as uranium, uranium oxide, uranium carbide, uranium-thorium carbides, thorium carbide, thorium oxide, plutonium carbide and the like.

Refractory materials which can be employed for the inner, expendable layer or coating include carbon, graphite and pyrocarbon applied at temperatures which cause deposit of soft or porous layers.

Coatings for the external shell of the fuel particles of the invention include, for example, dense pyrolytic carbon and refractory materials such as the carbides of zirconium, tungsten and tantalum and the like. It will be apparent that the ultimate temperature to which the particle is subjected, as well as the conditions under which it is to be employed respecting problems of corrosion and the like and the particular fissionable material employed will determine the material which is selected for external encasement. However, it will be apparent that when coated fuel particles having a yielding inner layer are made according to the present invention, the coefficient of expansion of the refractory material employed is no longer of limiting significance, and therefore, much greater freedom can be exercised in the selection thereof.

This inner layer is a very important, functional part of the composite fuel particles of the invention. It is intentionally made expendable or destructible in that its integrity is expected to be compromised by cracking or absorption of fission products or migration of fuel.

It has been found that pyrolytic carbon is especially useful for the purposes of the invention, since it can form a soft, yielding inner layer as well as an impermeable, extremely dense outer layer. The shell in this case appears to consist of concentric, spherical laminae, and the outer layer is very strong. Furthermore, such dense outer coatings are substantially impermeable to fission products, until they crack from internal pressure or radiation damage. The coated fuel particles of the invention are extremely resistant to thermal and mechanical shock.

An important advantage of these coatings lies in their ability to control and direct migration of the fissionable fuel. The inner coating acts as a sink or sponge, permitting migration along the interior of the outer, more dense shell.

It will be apparent from the foregoing that what is produced by the processes described herein is a nuclear fuel particle which consists essentially of a particle of normally solid fissionable material enclosed in a first inner destructible or expendable layer of carbon and a second, continuous, impermeable shell of a refractory material.

Typical dimensions of such a fuel particle are a core particle approximately 10 microns to 125 mils (preferably about 50 microns to 250 microns) in diameter, an inner layer on the surface of the spherule of about 5 to 50 microns thickness, and an external layer of refractory material of about 10 to 100 microns in thickness. The coating process tends to round off the particles, so that the end result is a substantially spherical or at least smooth, rounded nuclear fuel particle, about 90 microns to 150 mils in diameter. The volume of the inner layer which is available for absorption of fission products or diffusion of the fissionable material is thus quite considerable.

The starting materials for the process which results in the novel fissionable fuel products of the invention can be spherules made in any desired manner. A particularly useful process for producing spherules of uranium, thorium or uranium-thorium carbides, for example, is the following: small irregularly shaped discrete particles of uranium nono- or di-carbide or uranium (thorium) carbide (by which is meant any solid solution of the two metal carbides, the one in the other or mixture) of desired size are mixed with an isolating medium of low density, for example, very finely divided carbon, and rapidly heated to a temperature sufficient to form spherules by surface tension forces acting on the molten or semimolten carbide. After cooling, the isolating material is removed from the spherules. The process is preferably carried out in a nonreactive atmosphere, for example, using helium or argon gas.

The invention will now be further described with reference to specific examples illustrating the best mode presently contemplated of carrying out the invention. In the examples, all parts are by weight unless otherwise specified.

EXAMPLE 1

Spherules of uranium dicarbide about 100–200 microns in diameter, as described in U.S. Pat. No. 3,129,188, are placed in an apparatus for coating in which they are maintained in a fluidized bed. A machine such as that described in U.S. Pat. No. 2,779,241 can be employed. While maintaining the spherules of uranium dicarbide in suspended, i.e., fluidized, condition, a solution of a condensed furfural base resin (available under the trade name "Varcum No. 8251") in concentration of 5 percent in acetone is sprayed into the heated (to about 200°–300° C to cure the resin) coating apparatus, a sufficient amount of the solution being employed for each 100 grams of spherules to produce a coating on the spherules approximately 30 microns in thickness. The thus-coated spherules are transferred to a graphite crucible and placed in an induction-heated furnace provided with gas inlet and outlet connections and having means for rotating the crucible. A stream of argon is passed through the furnace to displace the air therein and after thorough flushing, the crucible is rotated to cause tumbling of the particles while heating the furnace by induction to a temperature of about 2000° C., as determined optically. Five percent by volume of methane is added to the argon and heating and rotation is continued for approximately one hour at about 2000° C., while a shell of dense pyrolytic carbon deposits uniformly over the entire surface of each spherule. The flow of methane into the argon is then cut off, and the stream of argon is continued while the crucible cools. During the part of this heating period in which the furnace comes up to temperature, the resin previously applied as a coating is carbonized to form a porous layer. However, the shell of pyrolytic carbon formed on the spherules is continuous and is about 30 microns in thickness, being dense and completely impermeable. The spherules thus coated can be heated to high temperatures in a reactor, yet the exterior shell of the fuel particles thus produced does not crack and remains impermeable to fission products.

EXAMPLE 2

A vertical tube furnace adapted for fluidized bed type operation is employed for producing the coatings of different density as described in this example. The furnace has a graphite tube about 2½ inches in diameter, the heating zone being about five inches in height. The usual electrical heating means surrounding the tube are employed, together with power source, thermostats and other controls adapted for the purpose. The furnace is provided at its lower end with a tube which is an inlet for fluidizing gas as well as for the methane employed for producing the pyrocarbon coating.

Argon is employed as a fluidizing gas, and is initially introduced at the rate of 10 to 15 cubic feet per hour. 500 grams of spherules of uranium dicarbide (density 10.7 g/cc) ranging in diameter from 88 to 105 microns are placed in the tube. The temperature is raised to the point where the spherules of uranium dicarbide are at 1350° C. Methane is then introduced into the gas stream at the rate of 3000 standard cubic centimeters per minute. If necessary, the rate of flow of the argon is adjusted to maintain the particles in the coating zone. The flow of methane and argon is continued at 1350° C. for 50 minutes. During this time, a layer of pyrocarbon 13 microns in thickness is uniformly deposited over the entire surface of the spherules. The density of the coat thus produced is 1.6 g/cc.

The furnace temperature is then increased until the spherules are at 2000° C. The density of the coated spherules has decreased, so that the flow of argon has to be reduced to about 5 to 10 cubic feet per hour. At the same time, methane is introduced at the rate of 7800 cubic centimeters per minute, and coating is continued for 36 minutes at 2000° C. During this time, a layer of dense, hard pyrocarbon having a thickness of 15 microns, is deposited over the first layer of pyrocarbon. The density of both layers combined is 2.05 g/cc.; the density of the outer layer alone is in the range of 2.1 to 2.2 g/cc.

The coated spherules thus produced have the advantageous properties described hereinabove, and are suitable for use in nuclear fuel elements.

EXAMPLE 3

For the purposes of the coating produced by the process of this example, a vertical tube furnace adapted for fluidized bed operation similar to that used in Example 2 is employed, having a tube ¾ inch in inside diameter. The height of the coating zone is about three inches.

Argon is introduced into the lower end of the tube at the rate of about 1900 to 2300 cc. per minute. The lower rate represents the rate of flow after coating has proceeded to some extent and the particles have become less dense. About 25 grams of uranium dicarbide spherules of 149–210 microns diameter, density about 10.7 g/cc. are placed in the tube. The temperature is increased until the spherules are at 1500° C. At this point, methane is introduced into the coating zone according to the following schedule.

| Successive Coating Periods minutes | Methane Flow cm³/min |
| --- | --- |
| 6.0 | 313 |
| 5.9 | 335 |
| 6.0 | 355 |
| 5.9 | 375 |
| 5.9 | 397 |
| 6.0 | 418 |
| 5.9 | 440 |
| 5.8 | 469 |

The result is to produce adequately controlled deposition at the rate of $1.5 \times 10^{-4}$ grams of carbon per cm² of surface area of spherules. In this way, a layer of pyrocarbon is placed on the spherules, about 40 microns thick and having a density of approximately 1.7 g/cc.

Because of the volume increase, the spherules are not conveniently further coated using the same reactor. A larger reactor is employed or, preferably, the batch is divided into three equal lots. Each lot is then individually placed into the coating furnace, the argon flow being adjusted to be between 2700 and 1500 cc/min., the lower rate being used as coating approaches the final stages. The temperature of the furnace is raised until the particles are at 2000° C. At this point, the rate of flow of methane for each of a number of successive coating periods is shown by the following table. In the table, to illustrate the change in rate of flow of fluidizing gas as the volume of the particles increases, the argon flow is also shown.

| Coating Period minutes | Methane Flow cc/min | Argon Flow cc/min |
| --- | --- | --- |
| 3.5 | 310 | 2723 |
| 3.3 | 333 | 2723 |
| 3.4 | 360 | 2723 |
| 3.3 | 370 | 2723 |
| 3.5 | 408 | 2723 |
| 3.4 | 438 | 3723 |
| 3.5 | 470 | 2723 |
| 3.5 | 500 | 2723 |
| 3.5 | 530 | 2723 |
| 3.5 | 562 | 2723 |
| 3.5 | 594 | 2313 |
| 3.4 | 624 | 2313 |
| 3.4 | 662 | 2313 |
| 3.5 | 698 | 2313 |
| 3.5 | 732 | 1558 |
| 3.5 | 770 | 1558 |
| 3.5 | 808 | 1558 |
| 3.4 | 846 | 1558 |

In this way, the rate of deposition is controlled to provide about $3.0 \times 10^{-4}$ grams of carbon per cm² of surface area. The particles receive an outer coating of dense, hard pyrocarbon about 100 microns in thickness, and having density about 2.1 g/cc.

These particles are also useful for preparing fuel elements for nuclear reactors.

What is claimed is:
1. A nuclear fuel particle which comprises
   a central core of normally solid fissionable material in the form of a spherule between about 10 microns and about 250 microns in diameter encased in a shell having at least two concentric layers,
   a yielding inner layer of said shell being composed of carbonaceous material and having a thickness between about 5 and about 50 microns, and
   an outer layer of said shell being composed of a substantially impermeable refractory material and having a thickness between about 10 and about 100 microns.
2. A nuclear fuel particle in accordance with claim 1 wherein said outer layer is formed of pyrocarbon.
3. A nuclear fuel particle in accordance with claim 1 wherein said yielding inner layer is formed of pyrocarbon.
4. A nuclear fuel particle in accordance with claim 1 wherein said yielding inner layer is sooty pyrocarbon.
5. A nuclear fuel particle in accordance with claim 1 wherein said inner layer is pyrocarbon having a density less than 1.8 g./cc.
6. A nuclear fuel particle in accordance with claim 5 wherein said pyrocarbon has a density between about 1.4 g./cc. and about 1.6 g./cc.
7. A nuclear fuel particle in accordance with claim 2 wherein said inner layer is sooty pyrocarbon having a density of about 1.4 g./cc.
8. A nuclear fuel particle in accordance with claim 7 wherein said outer layer has a density of at least about 2 g./cc.

* * * * *